United States Patent
Yokoyama et al.

(10) Patent No.: US 10,717,272 B2
(45) Date of Patent: Jul. 21, 2020

(54) LIQUID DISCHARGING DEVICE STORING A USE HISTORY

(71) Applicant: TOSHIBA TEC KABUSHIKI KAISHA, Tokyo (JP)

(72) Inventors: Shuhei Yokoyama, Mishima Shizuoka (JP); Satoshi Kaiho, Yokohama Kanagawa (JP); Ryutaro Kusunoki, Mishima Shizuoka (JP); Seiya Shimizu, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/105,087

(22) Filed: Aug. 20, 2018

(65) Prior Publication Data

US 2019/0061342 A1 Feb. 28, 2019

(30) Foreign Application Priority Data

Aug. 22, 2017 (JP) .................... 2017-159482

(51) Int. Cl.
*B41J 2/045* (2006.01)
*G01N 35/00* (2006.01)
*G01N 35/10* (2006.01)

(52) U.S. Cl.
CPC ......... *B41J 2/04536* (2013.01); *B41J 2/0458* (2013.01); *B41J 2/04581* (2013.01); *G01N 35/00623* (2013.01); *G01N 35/00732* (2013.01); *G01N 35/00871* (2013.01); *G01N 35/1009* (2013.01); *G01N 35/1083* (2013.01); *G01N 2035/009* (2013.01); *G01N 2035/0091* (2013.01); *G01N 2035/00782* (2013.01); *G01N 2035/00811* (2013.01); *G01N 2035/103* (2013.01); *G01N 2035/1034* (2013.01)

(58) Field of Classification Search
CPC .. B41J 2/04536; B41J 2/04581; B41J 2/0458; G01N 35/00871; G01N 35/1083; G01N 35/00623; G01N 35/1009; G01N 35/00732; G01N 2035/103; G01N 2035/00782; G01N 2035/1034; G01N 2035/00811; G01N 2035/0091; G01N 2035/009; B05B 17/0615; B05B 13/00; B05B 12/00
See application file for complete search history.

(56) References Cited

U.S. PATENT DOCUMENTS

| 9,821,552 B2 | 11/2017 | Yokoyama et al. |
| 2006/0190185 A1* | 8/2006 | Ford .................. G01N 1/312 702/19 |
| 2009/0049933 A1 | 2/2009 | Decaux et al. |

(Continued)

OTHER PUBLICATIONS

Extended European Search Report dated Jan. 28, 2019, mailed in counterpart European Application No. 18189612.7, 8 pages.

(Continued)

*Primary Examiner* — Bradley W Thies
(74) *Attorney, Agent, or Firm* — Kim & Stewart LLP

(57) ABSTRACT

According to one embodiment, a liquid discharging device includes a storage unit storing a use history indicating whether the liquid discharging device has been previously used, and a discharging device mounted on a liquid dispensing apparatus and configured to discharge a liquid when supplied a discharge voltage in response to a discharge signal received from the liquid dispensing apparatus.

12 Claims, 8 Drawing Sheets

(56) References Cited

U.S. PATENT DOCUMENTS

| | | |
|---|---|---|
| 2016/0375686 A1 | 12/2016 | Yokoyama et al. |
| 2017/0165969 A1 | 6/2017 | Yokoyama et al. |
| 2018/0065361 A1 | 3/2018 | Yokoyama et al. |
| 2018/0085745 A1 | 3/2018 | Yokoyama et al. |
| 2018/0085746 A1 | 3/2018 | Yokoyama et al. |
| 2018/0085757 A1 | 3/2018 | Yokoyama et al. |
| 2018/0086077 A1 | 3/2018 | Yokoyama et al. |
| 2018/0088142 A1 | 3/2018 | Yokoyama et al. |
| 2018/0169649 A1 | 6/2018 | Yokoyama et al. |
| 2018/0272333 A1 | 9/2018 | Higuchi et al. |
| 2018/0272334 A1 | 9/2018 | Higuchi et al. |
| 2018/0272335 A1 | 9/2018 | Higuchi et al. |
| 2018/0272345 A1 | 9/2018 | Higuchi et al. |
| 2018/0370227 A1* | 12/2018 | Hayashi ............... B41J 2/04581 |

OTHER PUBLICATIONS

U.S. Appl. No. 16/105,519, filed Aug. 20, 2018.
U.S. Appl. No. 16/104,976, filed Aug. 20, 2018.
U.S. Appl. No. 16/105,225, filed Aug. 20, 2018.
U.S. Appl. No. 16/105,107, filed Aug. 20, 2018.
U.S. Appl. No. 16/105,134, filed Aug. 20, 2018.

* cited by examiner

LIQUID DISCHARGING DEVICE STORING A USE HISTORY

CROSS-REFERENCE TO RELATED APPLICATION

This application is based upon and claims the benefit of priority from Japanese Patent Application No. 2017-159482, filed Aug. 22, 2017, the entire contents of which are incorporated herein by reference.

FIELD

Embodiments described herein relate generally to a liquid dispensing apparatus and a liquid discharging device.

BACKGROUND

In a liquid dispensing apparatus, a liquid is dispensed through a liquid discharging device. The liquid discharging device can be detachable from the liquid dispensing apparatus so that it can be discarded after a single use to prevent contamination.

However, there is a problem in existing dispensing systems in that the discharging device might be reused or kept in service even though the discharging device is designed, or at least intended, only for single use.

DETAILED DESCRIPTION

In general, according to one embodiment, a liquid discharging device includes a storage unit storing a use history indicating whether the liquid discharging device has been previously used, and a discharging device mounted on a liquid dispensing apparatus and configured to discharge a liquid when supplied a discharge voltage in response to a discharge signal received from the liquid dispensing apparatus.

Hereinafter, liquid dispensing apparatuses and liquid discharging devices according to certain example embodiments will be described with reference to the drawings. It should be noted, that the particular embodiments explained below are some possible examples of liquid dispensing apparatuses and chemical liquid discharging devices according to the present disclosure and do not limit the possible configurations, specifications, or the like of liquid dispensing apparatuses and liquid discharging devices according to the present disclosure. The drawings are schematic and are in some instances drawn with exaggeration and omissions for purposes of explanatory convenience. In general, components are not drawn to scale. The number of components, the dimensional ratio between different components, or the like does not necessarily match between different drawings or to actual devices.

First Embodiment

A discharging system according to a first embodiment discharges a predetermined liquid using a piezo jet method. For example, the discharging system discharges several picoliters (pL) to several microliters (µL) of a liquid into a microplate, a multi-well plate, or the like according to a user operation. For example, the discharging system is used in a laboratory in a technical field such as biology, chemistry, or pharmacy research.

Figure 1:
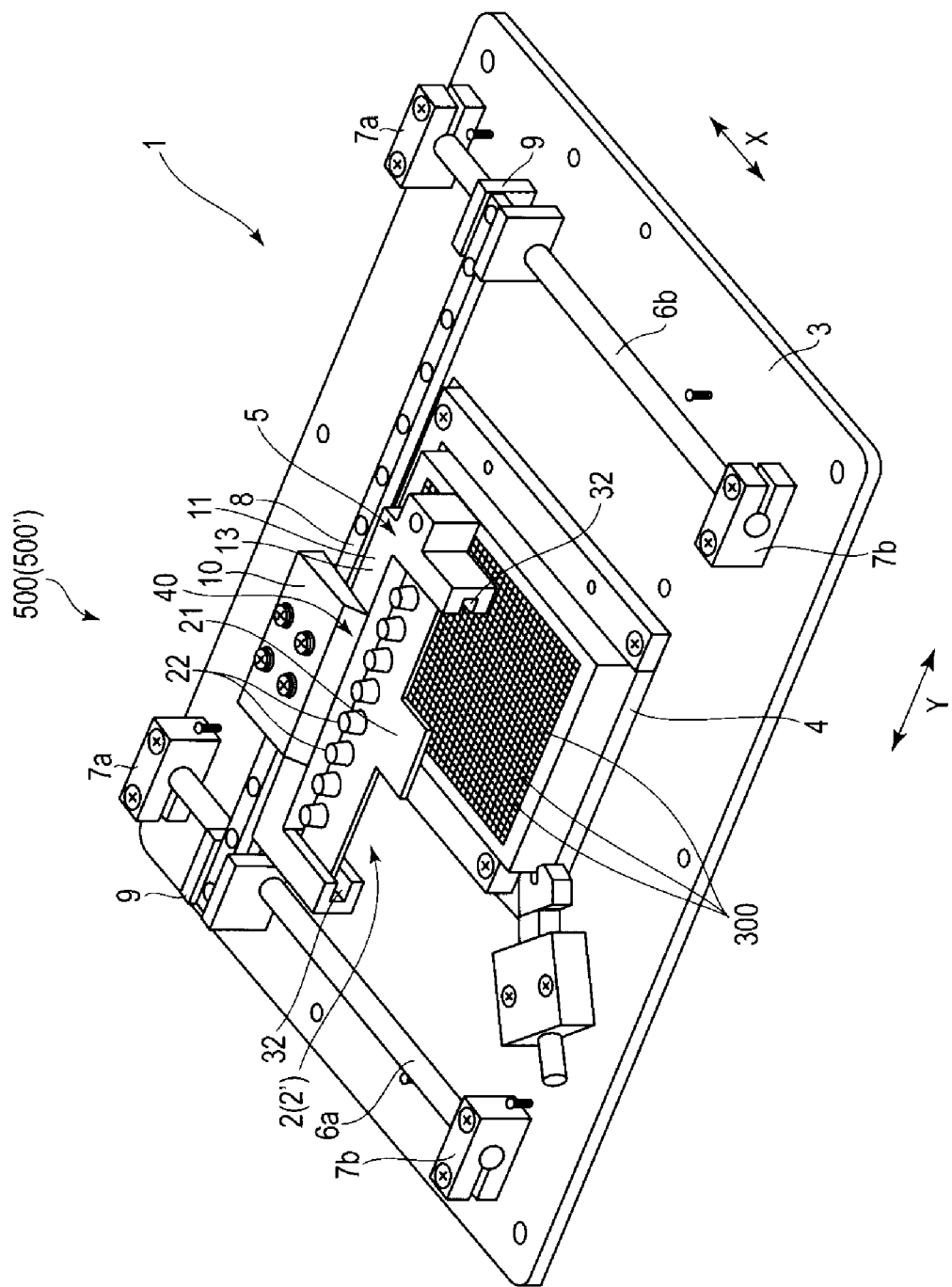
FIG. 1 is a schematic perspective view of a discharging system according to a first embodiment.
Figure 2:
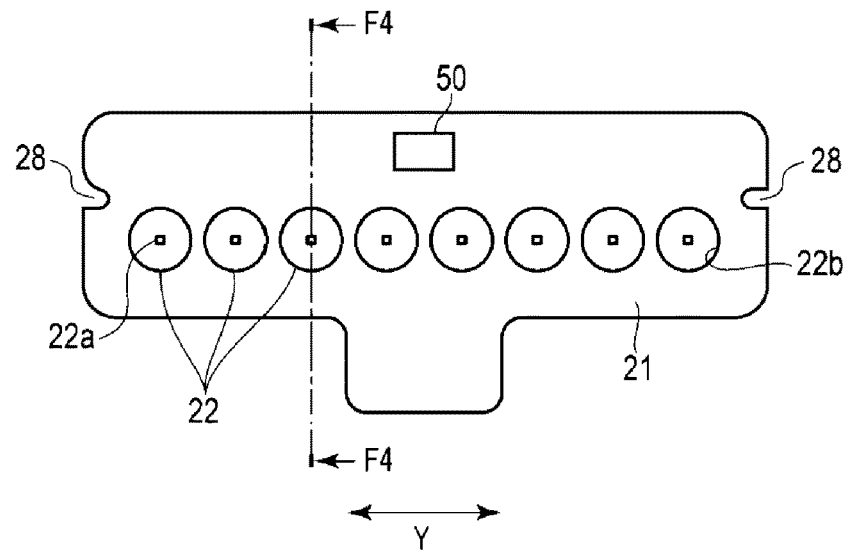
FIG. 2 is a top view of a liquid discharging device according to the first embodiment.
Figure 3:
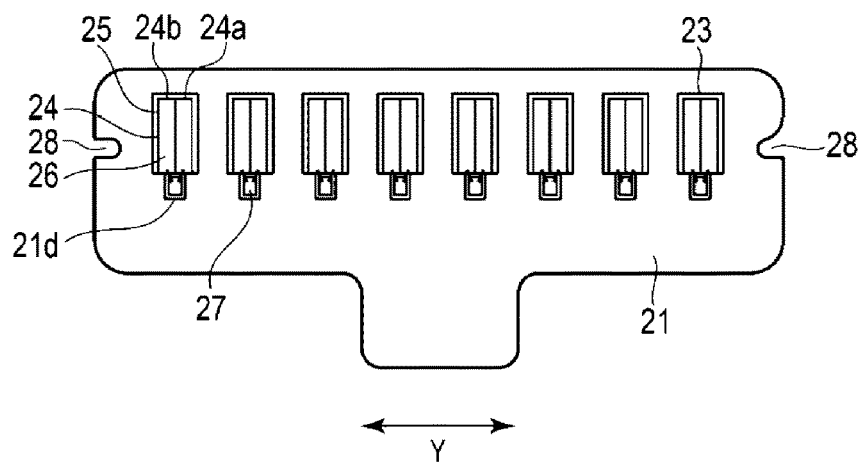
FIG. 3 is a bottom view of the liquid discharging device according to the first embodiment.
Figure 4:
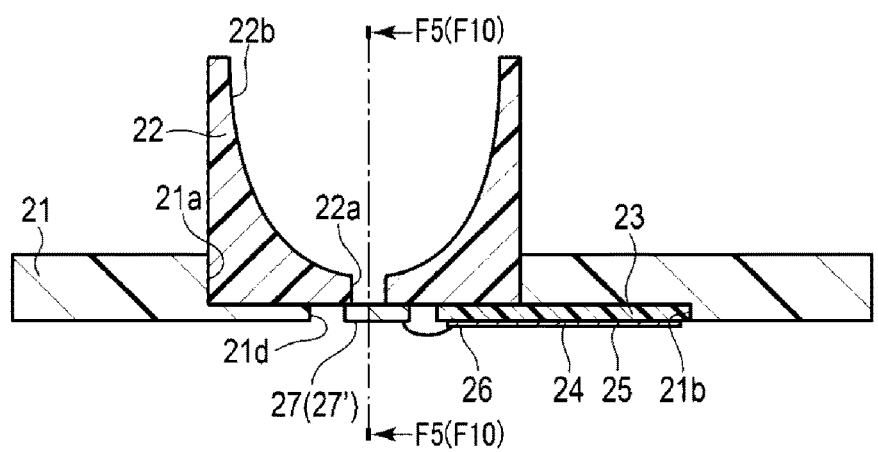
FIG. 4 is a cross-sectional view taken along a line F4-F4 of FIG. 2.
Figure 5:
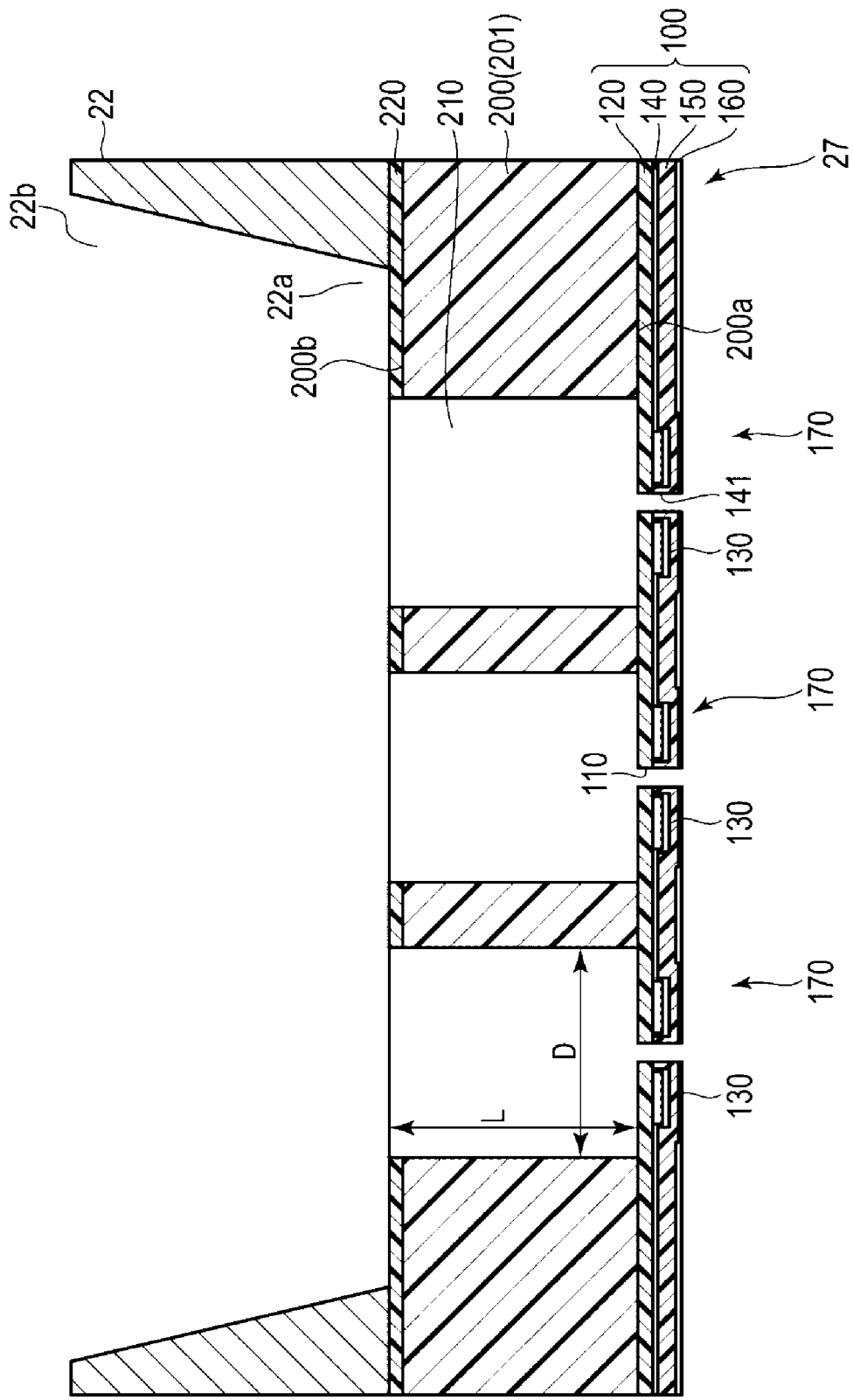
FIG. 5 is a cross-sectional view taken along a line F5-F5 of FIG. 4.

A configuration example of the discharging system according to the first embodiment will be described with reference to FIGS. 1 to 5. FIG. 1 is a schematic perspective view of the discharging system 500. FIG. 2 is a top view of a chemical liquid discharging device 2. FIG. 3 is a bottom view of a surface of the chemical liquid discharging device 2 from which a liquid is discharged. FIG. 4 is a cross-sectional view taken along a line F4-F4 in FIG. 2. FIG. 5 is a cross-sectional view taken along a line F5-F5 in FIG. 4.

As shown in FIG. 1, the discharging system 500 includes a chemical liquid dispensing apparatus 1, the chemical liquid discharging device 2, a host computer 18, and the like. The discharging system 500 may have more elements in addition to the elements depicted in FIG. 1, or some of the elements depicted in FIG. 1 may be omitted in some embodiments.

The chemical liquid dispensing apparatus (also referred to as a host apparatus) 1 controls the chemical liquid discharging device 2 to dispense a liquid from the chemical liquid discharging device 2.

The chemical liquid dispensing apparatus 1 includes a base 3 of a rectangular flat plate shape, and a mounting module 5 (also referred to as a mounting portion) that mounts the chemical liquid discharging device 2. In the first embodiment, it is assumed that the chemical liquid dispensing apparatus 1 dispenses the liquid into a microplate 4 having 1536 wells. Here, the front to rear direction of the base 3 is referred to as an X direction, and the right to left direction of the base 3 is referred to as a Y direction. The X direction and the Y direction are orthogonal.

The microplate 4 is fixed to the base 3. The microplate 4 includes a plurality of wells 300. Each well 300 of the microplate 4 holds a predetermined volume of a liquid. For example, the liquids in the microplate can be chemicals, reagents, solutions, solvents, or the like and/or may include cells, blood cells, bacteria, plasma, antibodies, DNA, nucleic acids or proteins.

The chemical liquid dispensing apparatus 1 includes a pair of right and left X direction guide rails 6a and 6b extending in the X direction on both sides of the microplate 4 on the base 3. Both ends each of the X direction guide rails 6a and 6b are fixed to fixing bases 7a and 7b protruding on the base 3.

A Y direction guide rail 8 extending in the Y direction is installed between the X direction guide rails 6a and 6b. Both ends of the Y direction guide rail 8 are fixed to an X direction moving base 9 that is slidable in the X direction along the X direction guide rails 6a and 6b, respectively.

The Y direction guide rail 8 includes a Y direction moving base 10 that allows a mounting module 5 to move in the Y direction along the Y direction guide rail 8. The mounting module 5 is mounted on the Y direction moving base 10. The chemical liquid discharging device 2 is fixed to the mounting module 5.

The chemical liquid discharging device 2 is supported so as to be movable to an arbitrary position in the XY directions orthogonal to each other by a combination of an operation of a movement in the Y direction moving base 10 along the Y direction guide rail 8 in the Y direction and an operation of a movement in the X direction moving base 9 along the X direction guide rails 6a and 6b in the X direction.

In the mounting module 5, a slit 32 for fixing the chemical liquid discharging device 2 is formed. When the chemical liquid discharging device 2 is inserted into the slit 32 from a front surface opening portion side of the slit 32, the chemical liquid discharging device 2 is fixed to the chemical liquid dispensing apparatus 1.

The mounting module 5 includes a driving circuit 11, a reader-writer 40 and the like.

The driving circuit 11 drives the chemical liquid discharging device 2 based on a signal from the processor 15. For example, the driving circuit 11 supplies a signal, electric power, or the like to the liquid discharging device 2 to discharge the liquid from the chemical liquid discharging device 2.

The reader-writer 40 (also referred to as a communication unit) is an interface device for communicating data to and from an IC module 50 of the chemical liquid discharging device 2 in accordance with a communication protocol of the IC module 50. For example, when the IC module 50 is a contact type module, the reader-writer 40 physically and electrically connects to a contact unit of the IC module 50, and the like.

When the IC module 50 is a non-contact type module, the reader-writer 40 is an antenna, a communication control unit, or the like, for wirelessly communicating with the IC module 50. The reader-writer 40 supplies power to activate the IC module 50, supplies clocks to the IC module 50, controls a reset operation of the IC module 50, transmits/receives data to/from the IC module 50, and the like.

The reader-writer 40 further transmits various commands to the IC module 50, receives a response for the transmitted command from the IC module, and the like, based on a control from the processor 15.

The reader-writer 40 is installed at a position corresponding to the position of the IC module 50 of the chemical liquid discharging device 2. That is, the reader-writer 40 is at a position where the reader-writer 40 can communicate with the IC module 50 when the chemical liquid discharging device 2 is set in the mounting module 5.

The chemical liquid discharging device 2 discharges the liquid based on a control of the chemical liquid dispensing apparatus 1.

The chemical liquid discharging device 2 includes a base member 21 of a flat planar shape that is a plate of a rectangular plate shape. As shown in FIG. 2, a plurality of chemical liquid holding containers 22 is arranged in a row in the Y direction, on a surface side of the base member 21. In the first embodiment, eight chemical liquid holding containers 22 are included. However, the number is not limited to eight. As shown in FIG. 4, the chemical liquid holding container 22 is a container of a cylindrical shape having a bottom, of which a top surface is opened. A chemical liquid holding container recessed portion 21a of a cylindrical shape is formed at a position corresponding to each chemical liquid holding container 22, on the surface side of the base member 21.

The bottom portion of the chemical liquid holding container 22 is adhered and fixed to the recessed portion 21a. A bottom surface opening portion 22a serving as a liquid outlet port is formed at the center position on the bottom portion of the chemical liquid holding container 22. The opening area of a top surface opening portion 22b is larger than the opening area of the bottom surface opening portion 22a of the liquid outlet port.

At both ends of the base member 21, mount fixing notches 28 for mounting and fixing the mounting module 5 are formed respectively. The mount fixing notch 28 is engaged with the mounting module 5. Two notches 28 of the base member 21 are formed in a notch shape of a semi-length cylindrical shape. The mount fixing notch 28 may be a notch shape of a semi-circular shape, a semi-elliptical shape, a triangular shape, or the like. In the first embodiment, the shapes of the two notches 28 are different from each other. Therefore, the left and right shapes of the base member 21 are different, and it is easy to identify the posture of the base member 21.

The chemical liquid discharging device 2 includes the IC module 50 on the base member 21. When the chemical liquid discharging device 2 is set in the chemical liquid dispensing apparatus 1, the chemical liquid discharging device 2 includes the IC module 50 at a position capable of communicating with the reader-writer 40. In FIG. 2, the chemical liquid discharging device 2 includes the IC module 50 at a center in Y axis direction.

The IC module 50 stores the use history of the chemical liquid discharging device 2. The IC module 50 transmits a response including the use history for a command transmitted from the reader-writer 40. The IC module 50 updates the use history in accordance with the command transmitted from the reader-writer 40.

As shown in FIG. 3, the same number of electrical substrate 23 as the chemical liquid holding container 22 are arranged in row in the Y direction, on a rear surface side of the base member 21. The electrical substrate 23 is a flat plate member of a rectangular shape. As shown in FIG. 4, an electrical substrate recessed portion 21b for mounting the electrical substrate 23 and a chemical liquid discharge array portion opening 21d connected with the electrical substrate recessed portion 21b are formed, on the rear surface side of the base member 21. A base end portion of the electrical substrate recessed portion 21b extends to the vicinity of an upper end portion of the base member 21 in FIG. 3 (the position in the vicinity of the right end portion in FIG. 4). As shown in FIG. 4, a distal end portion of the electrical substrate recessed portion 21b extends to a position overlapping a portion of the chemical liquid holding container 22. The electrical substrate 23 is adhered and fixed to the electrical substrate recessed portion 21b.

An electrical substrate wiring 24 is patterned and formed on a surface opposite to an adhesive fixing surface of the electrical substrate recessed portion 21b, on the electrical substrate 23. Wiring patterns 24a and 24b respectively connected to a driving element 130 are formed on the electrical substrate wiring 24.

A control signal input terminal 25 for inputting an electrical signal (also referred to as a driving signal) from the driving circuit 11 is formed at one end portion of the electrical substrate wiring 24. An electrode terminal connection portion 26 is provided at the other end portion of the electrical substrate wiring 24.

The base member 21 includes the chemical liquid discharge array portion opening 21d. As shown in FIG. 3, the chemical liquid discharge array portion opening 21d is an opening portion of a rectangular shape and is formed at a position overlapping with the chemical liquid holding container recessed portion 21a on the rear surface side of the base member 21.

A chemical liquid discharge array 27 is adhered and fixed to the bottom surface of the chemical liquid holding container 22 with the chemical liquid discharge array 27 covering the bottom surface opening portion 22a of the chemical liquid holding container 22. The chemical liquid discharge array 27 is disposed at a position corresponding to the chemical liquid discharge array portion opening 21d of the base member 21.

As shown in FIG. 5, the chemical liquid discharge array 27 is formed by laminating a nozzle plate 100 and a pressure chamber structure 200. The nozzle plate 100 includes a nozzle 110 that discharges the liquid, a diaphragm 120, the driving element 130 that is a driving unit, an insulation film 140 that insulates the driving element 130, a protection film 150 that is protection layer, a liquid repellant film 160. An actuator 170 includes the diaphragm 120 and the driving element 130. For example, a plurality of nozzles 110 is arranged in 3×3 rows. The plurality of nozzles 110 is positioned inside the bottom surface opening portion 22a of the liquid outlet port of the chemical liquid holding container 22. The chemical liquid holding container 22, the pressure chamber structure 200, the actuator 170, and the like form a discharging portion that discharges the liquid.

For example, the diaphragm 120 is integrated with the pressure chamber structure 200. When a heat treatment is performed on a silicon wafer 201 in an oxygen atmosphere, a $SiO_2$ (silicon oxide) film is formed on the surface of the silicon wafer 201. The diaphragm 120 uses the $SiO_2$ film on the surface of the silicon wafer 201 formed by the heat treatment in the oxygen atmosphere. The diaphragm 120 may be formed by depositing the $SiO_2$ film on the surface of the silicon wafer 201 by a CVD (Chemical Vapor Deposition) method.

The film thickness of the diaphragm 120 is preferably in a range of 1 to 30 μm. The diaphragm 120 may use a semiconductor material such as SiN (silicon nitride), $Al_2O_3$ (aluminum oxide), or the like, instead of the $SiO_2$ film.

The driving element 130 is formed in each nozzle 110. The driving element 130 is an annular shape surrounding the nozzle 110. The shape of the driving element 130 is not limited, and may be, for example, a C shape in which a portion of the circular ring is cut out.

The driving element 130 is electrically connected to the electrode terminal connection portion 26. The driving element 130 is driven by electric power supplied from the electrode terminal connection portion 26.

The driving element 130 includes a piezoelectric film that is a piezoelectric material, and uses PZT (Pb(Zr, Ti)$O_3$:lead zirconate titanate). For example, a piezoelectric film included in the driving element 130 may use a piezoelectric material such as PTO (PbTiO$_3$:lead titanate), PMNT (Pb(Mg$_{1/3}$Nb$_{2/3}$)O$_3$—PbTiO$_3$), PZNT (Pb(Zn$_{1/3}$Nb$_{2/3}$)O$_3$—PbTiO$_3$), KNN (a compound of KNbO$_3$ and NaNbO$_3$), ZnO, and AlN may be used.

The piezoelectric film included in the driving element 130 generates a polarization in the thickness direction. When an electric field in the same direction as the polarization is applied to the driving element 130, the driving element 130 extends or contracts in a direction orthogonal to the electric field direction. That is, the driving element 130 contracts or extends in a direction orthogonal to the film thickness direction.

The nozzle plate 100 includes the protection film 150. The protection film 150 includes a chemical liquid passage portion 141 of a cylindrical shape that is connected to the nozzle 110 of the diaphragm 120.

The nozzle plate 100 includes the liquid repellant film 160 that covers the protection film 150. For example, the liquid repellant film 160 is formed by spin-coating, for example, a silicone resin having a characteristic of repelling a chemical liquid. The liquid repellant film 160 may also be formed by a fluorinated resin material or the like.

The pressure chamber structure 200 includes a warp reduction film 220 that is a warp reduction layer on a surface opposite to the diaphragm 120. The pressure chamber structure 200 includes a pressure chamber 210 that penetrates the warp reduction film 220, is positioned at the position of the diaphragm 120, and is connected to the nozzle 110. For example, the pressure chamber 210 is formed in a circular shape positioned in the same axis as the nozzle 110.

The pressure chamber 210 includes an opening portion connected to the bottom surface opening portion 22a of the chemical liquid holding container 22. It is preferable that the size L in the depth direction of the opening portion of the pressure chamber 210 is larger than the size D in the width direction of the opening portion of the pressure chamber 210. The size L in the depth direction is set to be larger than the size D in the width direction. Therefore, the pressure applied to the liquid in the pressure chamber 210 may delay an escape to the chemical liquid holding container 22 by a vibration of the diaphragm 120 of the nozzle plate 100.

In the pressure chamber structure 200, the side on which the diaphragm 120 of the pressure chamber 210 is disposed is referred to as a first surface 200a and the side on which the warp reduction film 220 is disposed is referred to as a second surface 200b. The chemical liquid holding container 22 is adhered to the side of the warp reduction film 220 of the pressure chamber structure 200 by, for example, an epoxy type adhesive. The pressure chamber 210 of the pressure chamber structure 200 is connected to the bottom surface opening portion 22a of the chemical liquid holding container 22 by an opening portion of the side of the warp reduction film 220.

The diaphragm 120 deforms in the thickness direction by an operation of the driving element 130 of a surface shape. The chemical liquid discharging device 2 discharges the liquid supplied to the nozzle 110 by a pressure change generated in the pressure chamber 210 of the pressure chamber structure 200 due to the deformation of the diaphragm 120.

Next, a control system of the discharging system 500 will be described.

As described above, the discharging system 500 includes the chemical liquid dispensing apparatus 1, the chemical liquid discharging device 2, the host computer 18 and the like.

The host computer 18 controls the chemical liquid dispensing apparatus 1 according to a user operation. The host computer 18 includes an operation unit 18a, a display unit 18b, and the like. The host computer 18 includes a processor, a RAM, a ROM, a non-volatile memory (NVM), and the like.

The operation unit 18a receives an operation instruction from the user. For example, the operation unit 18a is a keyboard, a mouse, a touch panel, or the like.

The display unit 18b displays various kinds of information by a control of the processor 15. For example, the display unit 18b includes a liquid crystal display. When the operation unit 18a includes a touch panel or the like, the display unit 18b may be formed integrally with the operation unit 18a.

The host computer 18 receives various inputs through the operation unit 18a. For example, the host computer 18 receives an input indicating that the chemical liquid holding container 22 has been filled with a liquid. The host computer 18 receives an input selection for discharging the liquid from the chemical liquid holding container 22.

When the host computer 18 receives the input selection for discharging the liquid from the chemical liquid holding container 22, the host computer 18 transmits a signal for discharging the liquid to the chemical liquid dispensing apparatus 1.

The host computer 18 may receive inputs for each chemical liquid holding container 22. For example, the host computer 18 may receive an input indicating that the filling has been completed or discharging has been instructed separately for each chemical liquid holding container 22.

Figure 6:
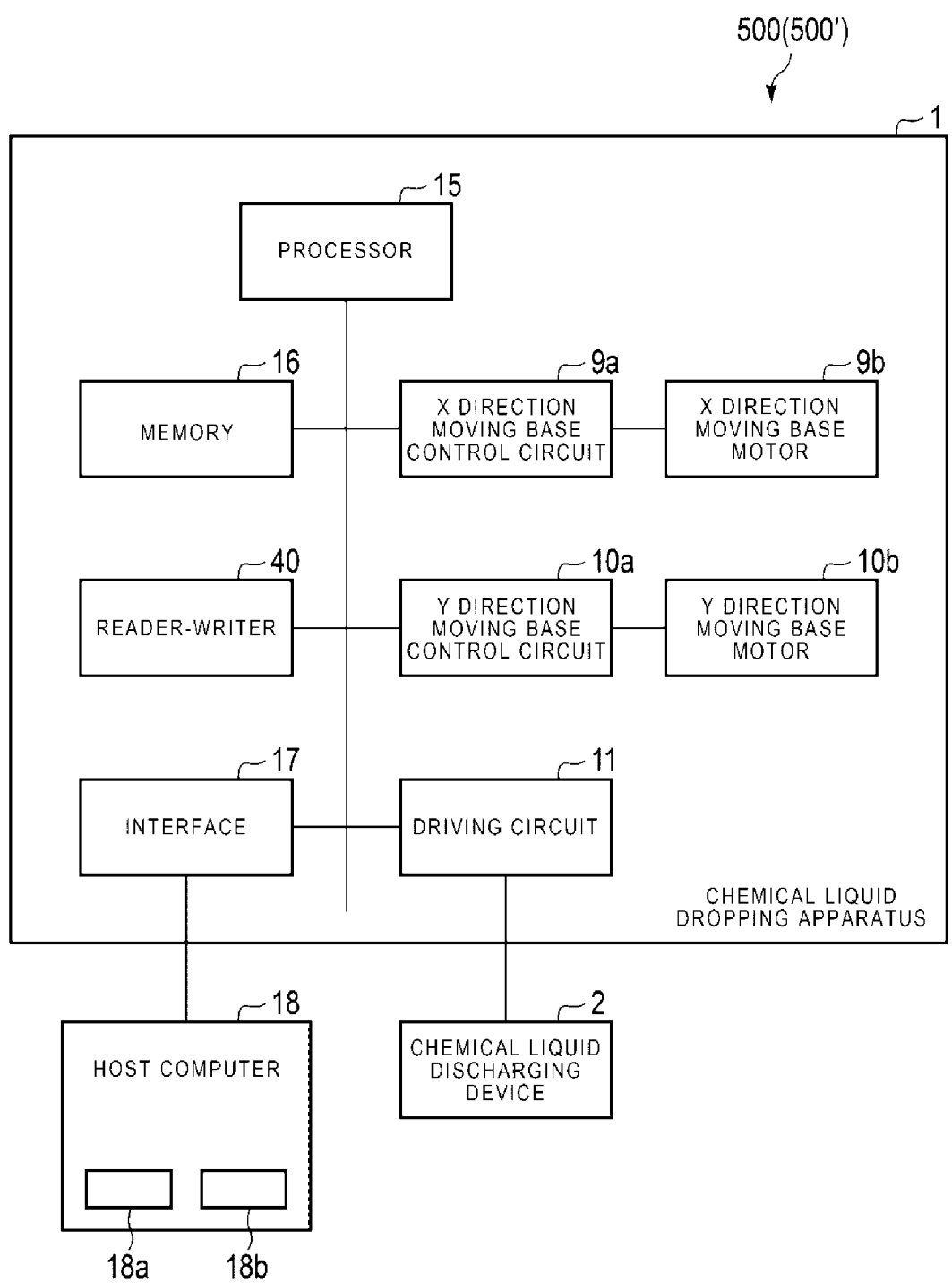
FIG. 6 is a block diagram of a control system of the discharging system according to the first embodiment.

As shown in FIG. 6, the chemical liquid dispensing apparatus 1 includes the X direction moving base control circuit 9a, the X direction moving base motor 9b, the Y direction moving base control circuit 10a, the Y direction moving base motor 10b, the driving circuit 11, the processor 15, the memory 16, the interface 17, the reader-writer 40, and the like. Such units are connected to each other through a data bus. The chemical liquid dispensing apparatus 1 may have more elements in addition to the elements depicted in FIG. 6, or some of the elements depicted in FIG. 6 may be omitted in some embodiments.

The processor 15 has a function of controlling all operations of the chemical liquid dispensing apparatus 1. The processor 15 may include an internal cache, various interfaces, and the like. The processor 15 realizes various processes by executing a program stored in advance in the internal cache, the memory 16, or the like.

Some of the various functions realized by the execution of the program by the processor 15 may be realized by a hardware circuit. In this case, the processor 15 controls a function executed by the hardware circuit.

The memory 16 stores various data. For example, the memory 16 stores a control program, a control data, and the like. The control program and the control data are incorporated in advance according to a specification of the chemical liquid dispensing apparatus 1. The control program is a program or the like supporting the function realized by the chemical liquid dispensing apparatus 1.

The memory 16 temporarily stores data or the like under processing of the processor 15. The memory 16 may store data necessary for executing an application program, an execution result of the application program, and the like.

The interface 17 is an interface for communicating data to and from the host computer 18. For example, the interface 17 is connected to the host computer 18 through a wired or wireless line. For example, the interface 17 may support a LAN connection, a USB connection, or a Bluetooth connection.

The X direction moving base control circuit 9a drives the X direction moving base motor 9b based on a signal from the processor 15. The X direction moving base control circuit 9a drives the X direction moving base motor 9b by supplying a signal or electric power to the X direction moving base motor 9b.

The X direction moving base motor 9b moves the X direction moving base 9 in the X direction. For example, the X direction moving base motor 9b is connected to the X direction moving base 9 through a gear or the like and moves the X direction moving base 9 in the X direction.

The Y direction moving base control circuit 10a drives the Y direction moving base motor 10b based on a signal from the processor 15. The Y direction moving base control circuit 10a drives the Y direction moving base motor 10b by supplying a signal or electric power to the Y direction moving base motor 10b.

The Y direction moving base motor 10b moves the Y direction moving base 10 in the Y direction. For example, the Y direction moving base motor 10b is connected to the Y direction moving base 10 through a gear or the like and moves the Y direction moving base 10 in the Y direction.

Next, the IC module 50 will be described.

Figure 7:
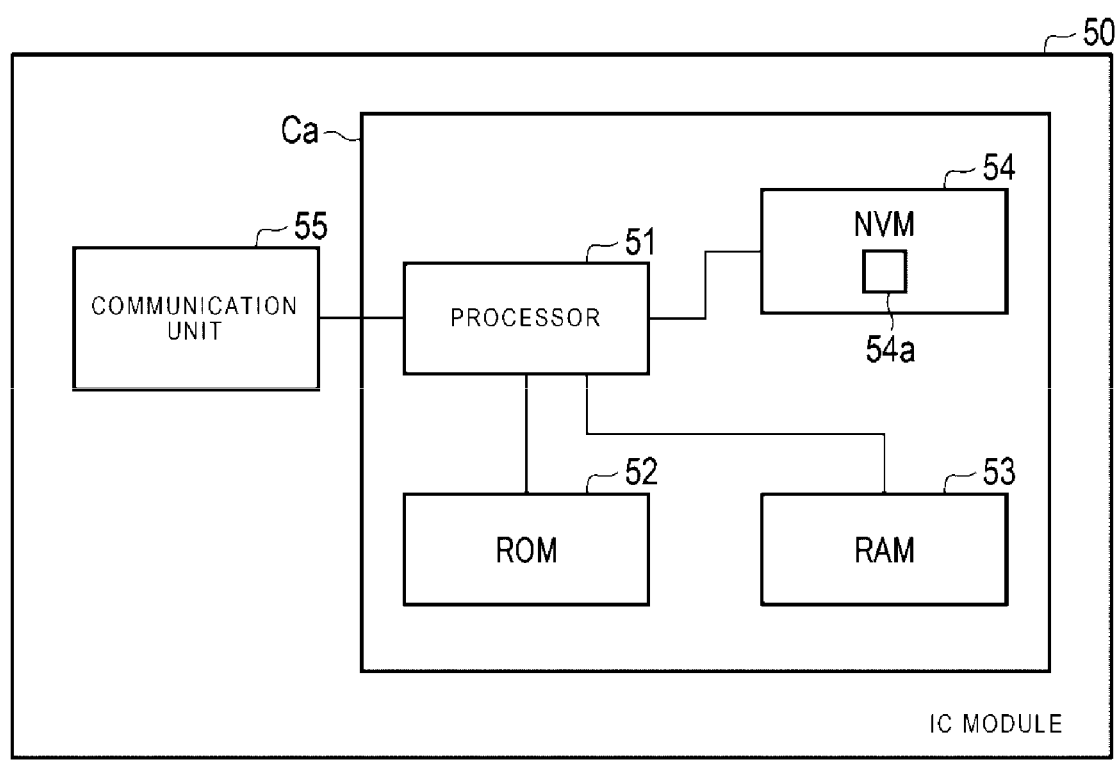
FIG. 7 is a block diagram of a configuration example of an IC module according to the first embodiment.

FIG. 7 shows a configuration example of the IC module 50.

The IC module 50 includes an IC chip Ca and a communication unit 55 (also referred as an external interface).

The communication unit 55 and the IC chip Ca are integrated in the IC module 50 and connect to each other. The IC chip Ca includes a processor 51, a ROM 52, a RAM 53, a NVM 54, and the like. The processor 51, the ROM 52, the RAM 53, the NVM 54 and the communication unit 55 are connected to each other through a data bus. The IC module 50 may have more elements in addition to the elements depicted in FIG. 7, or some of the elements depicted in FIG. 7 may be omitted in some embodiments.

The processor 51 has a function of controlling all operations of the IC module 50. The processor 51 realizes various processes based on a control program or control data, which is stored in advance in the ROM 52 or the NVM 54. The processor 51 realizes controls and information processes for each unit of the IC module 50 by executing a program. For example, the processor 51 carries out operation controls for the IC module 50 or various processes in accordance with an operational state of the IC module 50 by executing a program stored in the ROM 52.

Some of the various functions realized by the execution of the program by the processor 51 may be realized by a hardware circuit. In this case, the processor 51 controls a function executed by the hardware circuit.

The ROM 52 is a nonvolatile memory in which a control program, control data, and the like are stored in advance. The ROM 52 is incorporated into the IC module 50 in a state of storing the control program, the control data, and the like at a manufacturing stage. That is, the control program and the control data stored in the ROM 52 are incorporated in advance according to a specification of the IC module 50 and the like.

The RAM 53 is a volatile memory. The RAM 53 temporarily stores data or the like under processing of the processor 51. For example, the RAM 53 functions as a calculation buffer, a receiving buffer and a transmitting buffer. The calculation buffer temporarily holds results of various calculation processes executed by the processor 51 or the like. The receiving buffer holds command data received by the chemical liquid dispensing apparatus 1 via the communication unit 55 or the like. The transmitting buffer holds messages (referred to response data) transmitted to the chemical liquid dispensing apparatus 1 via the communication unit 55 or the like.

The NVM 54 includes a nonvolatile memory capable of writing and rewriting data, for example, an EEPROM®, a flash ROM, or the like. The NVM 54 stores a control program, an application, various data, and the like according to an operational application of the IC module 50. For example, program files and data files are created in the NVM 54. The control program, the various data, or the like is written in each of the created files.

The NVM 54 includes a storage area 54*a* that stores the use history. The use history will be described in detail later.

The communication unit 55 is an interface for communicating data to and from the chemical liquid dispensing apparatus 1. That is, the communication unit 55 is an interface for communicating with the reader-writer 40 of the chemical liquid dispensing apparatus 1. When the IC module 50 is implemented as a contact type IC card, the communication unit 55 includes a communication control unit and a contact unit for physically and electrically connecting to the reader-writer 40 of the chemical liquid dispensing apparatus 1 in order to transmit and receive a signal. For example, the IC module 50 is activated by receiving operating power and an operating clock from the chemical liquid dispensing apparatus 1 thorough the contact unit.

When the IC module 50 is implemented as a non-contact type IC card, the communication unit 55 includes a communication control unit, such as a modulation/demodulation circuit, and an antenna for wirelessly communicating with the reader-writer 40 of the chemical liquid dispensing apparatus 1. For example, the IC module 50 receives a radio wave from the reader-writer 40 of the chemical liquid dispensing apparatus 1 through the modulation/demodulation circuit or the like. The IC module 50 is activated by generating operating power and an operating clock from the radio wave using a power source unit that is not shown in the drawing.

Next, the use history stored in the storage area 54*a* will be described.

The use history indicates whether or not the chemical liquid discharging device 2 has been used. For example, the use history indicates whether or not the liquid is discharged from the chemical liquid discharging device 2. When the chemical liquid discharging device 2 discharges the liquid once (from at least one chemical liquid holding container 22), the use history indicates that the chemical liquid discharging device 2 has been used.

For example, the use history is a bit or the like indicating whether or not the chemical liquid discharging device 2 has been used. For example, in a case of "0", the use history indicates that the chemical liquid discharging device 2 has not been used (unused). In a case of "1", the use history indicates that the chemical liquid discharging device 2 has been used.

For example, at the time of manufacturing the chemical liquid discharging device 2, the use history indicates that the chemical liquid discharging device 2 has not been used (unused).

Next, a function realized by the processor 51 of the IC module 50 will be described. The following function is realized by the processor 51 executing the program stored in the NVM 54 or the like.

First, the processor 51 has a function of transmitting the use history to the reader-writer 40 through the communication unit 55.

For example, the processor 51 receives a command requesting the use history from the processor 15 through the communication unit 55. When the processor 51 receives the command, the processor 51 acquires the use history from the storage area 54*a*. When the processor 51 acquires the use history, the processor 51 transmits a response including the use history to the processor 15 through the communication unit 55.

The processor 51 has a function of rewriting the use history according to a command from the reader-writer 40.

For example, the processor 51 receives a command instructing to write information indicating that the chemical liquid discharging device 2 has been used in the storage area 54*a* through the communication unit 55. When the processor 51 receives the command, the processor 51 stores the information (for example, bit) indicating that the chemical liquid discharging device 2 is used as the use history in the storage area 54*a*. When the processor 51 stores the information indicating that the chemical liquid discharging device 2 has been used in the storage area 54*a*, the processor 51 transmits a response indicating that the use history is successfully rewritten to the reader-writer 40 through the communication unit 55.

When the processor 51 stores the information indicating that the chemical liquid discharging device 2 has been used as the use history, the processor 51 may lock the storage area 54*a*.

Next, the function realized by the processor 15 of the chemical liquid dispensing apparatus 1 will be described. The following function is realized by the processor 15 executing the program stored in the memory 16 or the like.

First, the processor 15 has a function of acquiring the use history from the IC module 50.

The processor 15 determines whether or not the chemical liquid discharging device 2 is set in the mounting module 5. For example, the processor 15 determines whether or not the chemical liquid discharging device 2 is set in the mounting module 5 according to a signal from a sensor that is not shown in the drawing.

When it is determined that the chemical liquid discharging device 2 is set in the mounting module 5, the processor 15 transmits a command requesting the use history to the IC module 50 through the reader-writer 40. The processor 15 receives a response including the use history as a response for the command from the IC module 50.

The processor 15 has a function of discharging the liquid from the chemical liquid discharging device 2 based on the acquired use history.

When the acquired use history indicates that the chemical liquid discharging device 2 has not been used, the processor 15 causes the chemical liquid discharging device 2 to discharge the chemical liquid.

For example, the operator supplies a predetermined amount of the liquid to the chemical liquid holding container 22 from the top surface opening portion 22*b* of the chemical liquid holding container 22 by a pipette or the like. The liquid is inside the chemical liquid holding container 22. The bottom surface opening portion 22*a* of the bottom portion of the chemical liquid holding container 22 is connected to the chemical liquid discharge array 27. The liquid in the chemical liquid holding container 22 is filled in each pressure chamber 210 of the chemical liquid discharge array 27 through the bottom surface opening portion 22*a* of the bottom surface of the chemical liquid holding container 22.

The liquid reagent in the chemical liquid discharging device 2 includes any of, for example, a low molecular weight compound, a fluorescent reagent, a protein, an antibody, a nucleic acid, a plasma, a bacteria, a blood cell or a cell. In general, a main solvent in the liquid (substance having the largest weight ratio or volume ratio) is water, glycerin, or dimethylsulfoxide.

The user inputs an operation instruction for discharging the liquid to the operation unit 18a of the host computer 18. The operator may input the operation instruction for discharging the liquid from a specific chemical liquid holding container 22.

When the host computer 18 receives the operation instruction for discharging the liquid, the host computer 18 transmits a signal (discharge signal) instructing the discharge of the liquid with respect to the chemical liquid dispensing apparatus 1. The discharge signal may be an instruction of the discharge of the liquid from a specific chemical liquid holding container 22.

The processor 15 receives the discharge signal through the interface 17. When the acquired use history indicates that the chemical liquid discharging device 2 has not been used, the processor 15 causes the chemical liquid discharging device 2 to discharge the liquid based on the discharge signal.

The processor 15 controls the X direction moving base motor 9b and the Y direction moving base motor 10b to move the chemical liquid discharging device 2 set in the mounting module 5 to a predetermined position. For example, the processor 15 moves the chemical liquid discharging device 2 to a position where the plurality of nozzles 110 is inserted into a well 300. The processor 15 may move the chemical liquid discharging device 2 to the predetermined position according to the discharge signal.

When the chemical liquid discharging device 2 is moved to the predetermined position, the processor 15 applies a discharge voltage to the driving element 130 using the driving circuit 11 for discharging the liquid.

The processor 15 transmits a signal to the driving circuit 11, and a voltage control signal is input from the driving circuit 11 to the driving element 130. In response to the application of the voltage control signal, the driving element 130 deforms the diaphragm 120 to change the volume of the pressure chamber 210. Therefore, the liquid is discharged as a droplet from the nozzle 110 of the chemical liquid discharge array 27. As a result, the chemical liquid discharging device 2 dispenses a predetermined amount of liquid from the nozzle 110 to the well 300 of the microplate 4.

To dispense the predetermined amount of liquid to each well 300 of the microplate 4, the processor 15 repeats an operation of transmitting a signal to the X direction moving base control circuit 9a, the Y direction moving base control circuit 10a, and the driving circuit 11.

The number of times and the position at which the processor 15 causes the liquid to be discharged are not limited to a specific configuration.

When the use history indicates that the chemical liquid discharging device 2 has not been used, the processor 15 may transmit a signal indicating that the chemical liquid discharging device 2 has not been used to the host computer 18. The host computer 18 may display that the chemical liquid discharging device 2 has not been used on the display unit 18b or the like, based on the corresponding signal.

When the acquired use history indicates that the chemical liquid discharging device 2 has been previously used, the processor 15 does not discharge the liquid from the chemical liquid discharging device 2.

For example, when the acquired use history indicates that the chemical liquid discharging device 2 has been previously used, the processor 15 does not discharge the liquid even when the processor 15 receives the discharge signal. The processor 15 transmits a signal indicating that the chemical liquid discharging device 2 has been previously used to the host computer 18 through the interface 17.

When the host computer 18 receives the corresponding signal, the host computer 18 displays a warning or the like indicating that the chemical liquid discharging device 2 has been previously used on the display unit 18b or the like.

The processor 15 has a function of storing the use history indicating that the chemical liquid discharging device 2 has been used in the IC module 50 of the chemical liquid discharging device 2 when the liquid has been discharged.

When the discharge of the liquid has been completed, the processor 15 generates a command instructing to rewrite the use history to indicate that the chemical liquid discharging device 2 has been used. For example, the processor 15 generates a command instructing to rewrite the use history stored in the storage area 54a. The processor 15 transmits the generated command to the IC module 50 through the reader-writer 40.

The processor 15 receives a response indicating that the rewriting has been completed from the IC module 50 through the reader-writer 40. When the processor 15 receives a response indicating that the rewriting has been failed or when the processor 15 has not receive the response, the processor 15 may re-transmit the generated command to the IC module 50.

Next, an operation example of the processor 15 of the chemical liquid dispensing apparatus 1 will be described.

Figure 8:
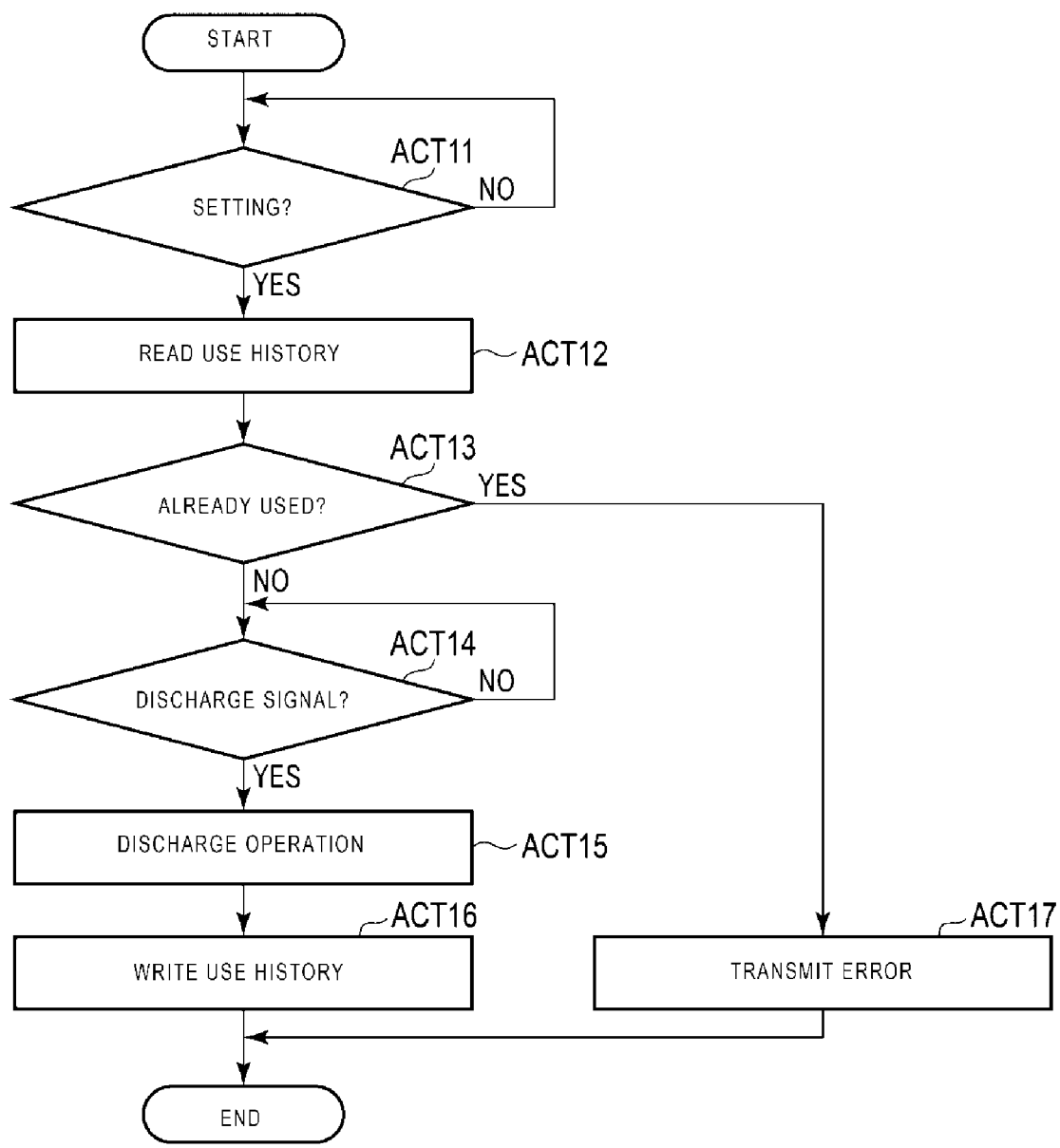
FIG. 8 is a flowchart showing an operation example of a liquid dispensing apparatus according to the first embodiment.

FIG. 8 is a flowchart for describing the operation example of the processor 15 of the chemical liquid dispensing apparatus 1.

First, the processor 15 determines whether or not the chemical liquid discharging device 2 is set in the mounting module 5 (ACT 11). When it is determined that the chemical liquid discharging device 2 is not set in the mounting module 5 (ACT 11, NO), the processor 15 returns to ACT 11.

When it is determined that the chemical liquid discharging device 2 is set in the mounting module 5 (ACT 11, YES), the processor 15 reads the use history from the IC module 50 (ACT 12). According to the use history from IC module 50, the processor 15 determines whether or not the use history indicates that the chemical liquid discharging device 2 has been previously used (ACT 13).

When it is determined that the use history indicates that the chemical liquid discharging device 2 has not been used (is previously unused) (ACT 13, NO), the processor 15 determines whether or not the discharge signal has been received through the interface 17 (ACT 14). When it is determined that the discharge signal has not been received through the interface 17 (ACT 14, NO), the processor 15 returns to ACT 14.

When it is determined that the discharge signal has been received through the interface 17 (ACT 14, YES), the processor 15 causes the chemical liquid discharging device 2 to discharge the liquid according to the discharge signal (ACT 15).

When the chemical liquid discharging device 2 has been caused to discharge the liquid, the processor 15 rewrite the use history stored in the IC module 50 to indicate that the chemical liquid discharging device 2 has been previously used (ACT 16).

When it is determined that the use history indicates that the chemical liquid discharging device 2 has been previously used (ACT 13, YES), the processor 15 transmits the signal indicating that the chemical liquid discharging device 2 has been previously used to the host computer 18 through the interface 17 (ACT 17).

When the used history stored in the IC module 50 indicates that the chemical liquid discharging device 2 has been previously used (ACT 16), or when the signal indicating that the chemical liquid discharging device 2 has been previously used is transmitted to the host computer 18 (ACT 17), the processor 15 ends the operation.

The chemical liquid discharging device 2 may include a memory for storing the use history instead of the IC module 50. The chemical liquid dispensing apparatus 1 may directly access to the memory to acquire the use history. The chemical liquid dispensing apparatus 1 may directly access to the memory to rewrite the use history to indicate that the chemical liquid discharging device 2 has been used.

The host computer 18 may transmit a request to rewrite the use history to indicate that the chemical liquid discharging device 2 has been previously used to the processor 15. The processor 15 may rewrite the use history stored in the IC module 50 to indicate that the chemical liquid discharging device 2 has been previously used according to the request.

The IC module 50 may store the use history of each chemical liquid holding container 22. That is, the IC module 50 stores the information indicating whether or not each chemical liquid holding container 22 has been used.

For example, the processor 15 acquires the use history of each chemical liquid holding container 22 from the IC module 50. After the processor acquires the use history, the processor 15 receives the discharge signal from the host computer 18 for discharging the liquid from the chemical liquid holding container 22. Once the discharge signal has been received, the processor 15 determines whether or not the use history indicates the corresponding chemical liquid holding container 22 has been previously used. When the use history indicates that the chemical liquid holding container 22 has not been used (that is unused), the processor 15 causes the chemical liquid holding container 22 to discharge the liquid according to the discharge signal. Once the discharge operation has been completed, the processor 15 rewrites the use history of the corresponding chemical liquid holding container 22 stored in the IC module 50 to indicate that the corresponding chemical liquid holding container 22 has been used.

When the use history of the corresponding chemical liquid holding container 22 indicates that the corresponding chemical liquid holding container 22 has been used, the processor 15 does not perform the discharge operation even after the processor 15 receives the discharge signal. In this case, the processor 15 may transmit a signal indicating that the corresponding chemical liquid holding container 22 has been previously used to the host computer 18.

The discharging system can rewrite the use history of the corresponding liquid discharging device in the IC module. The discharging system can check the use history before discharging a liquid from the liquid discharging device. When the use history stored in the IC module indicates that the liquid discharging device has been used, the discharging system does not cause the liquid discharging device to discharge the liquid.

When the liquid discharging device discharges the liquid, the discharging system rewrites the use history stored in the IC module to indicate that the liquid discharging device has been used.

As a result, the discharging system can prevent the discharge of a liquid via the reuse of a liquid discharging device that has been previously used.

Second Embodiment

A chemical liquid dispensing apparatus 1 according to a second embodiment is different from that of the first embodiment in that the chemical liquid dispensing apparatus 1 according to the second embodiment rewrites the use history stored in the IC module 50 to indicate that the chemical liquid holding container 22 has been used once the chemical liquid holding container 22 has been filled with the liquid. The same reference numerals are used for the components that are substantially the same as those of the first embodiment, and detailed descriptions of repeated components may be omitted.

The host computer 18 receives an input indicating that the chemical liquid holding container 22 has been filled with a liquid through the operation unit 18a. For example, when the chemical liquid holding container 22 has been filled with the liquid, the user enters an input that indicating filling of the liquid has been completed to the operation unit 18a.

When the host computer 18 receives the input indicating the filling of the chemical liquid holding container 22 has been completed, the host computer 18 transmits a filling signal indicating that the chemical liquid holding container 22 has been filled with the liquid to the chemical liquid dispensing apparatus 1 through the interface 17.

Next, the function realized by the processor 15 of the chemical liquid dispensing apparatus 1 will be described. The following function is realized by the processor 15 executing the program stored in the memory 16 or the like.

The processor 15 has a function of detecting that the chemical liquid holding container 22 has been filled with the liquid.

For example, the processor 15 determines whether or not the filling signal has been received from the host computer 18. When it is determined that the filling signal has been received from the host computer 18, the processor 15 determines that the chemical liquid holding container 22 has been filled with the liquid.

The chemical liquid dispensing apparatus 1 or the chemical liquid discharging device 2 may include a sensor for detecting that the chemical liquid holding container 22 has been filled with the liquid. The processor 15 may detect that the chemical liquid holding container 22 has been filled with the chemical liquid using the corresponding sensor.

A method of detecting whether or not the chemical liquid holding container 22 has been filled with the liquid by the processor 15 is not limited to any specific method.

The processor 15 has a function of rewriting the use history stored in the IC module 50 to indicate that the chemical liquid discharging device 2 has been used when the processor 15 detects that the chemical liquid holding container 22 has been filled with the liquid.

The operation of rewriting the use history stored in the IC module 50 to indicate that the chemical liquid discharging device 2 has been used by the processor 15 is the same as that of the first embodiment, and detailed descriptions thereof are omitted.

Next, an operation example of the processor 15 of the chemical liquid dispensing apparatus 1 will be described.

Figure 9:
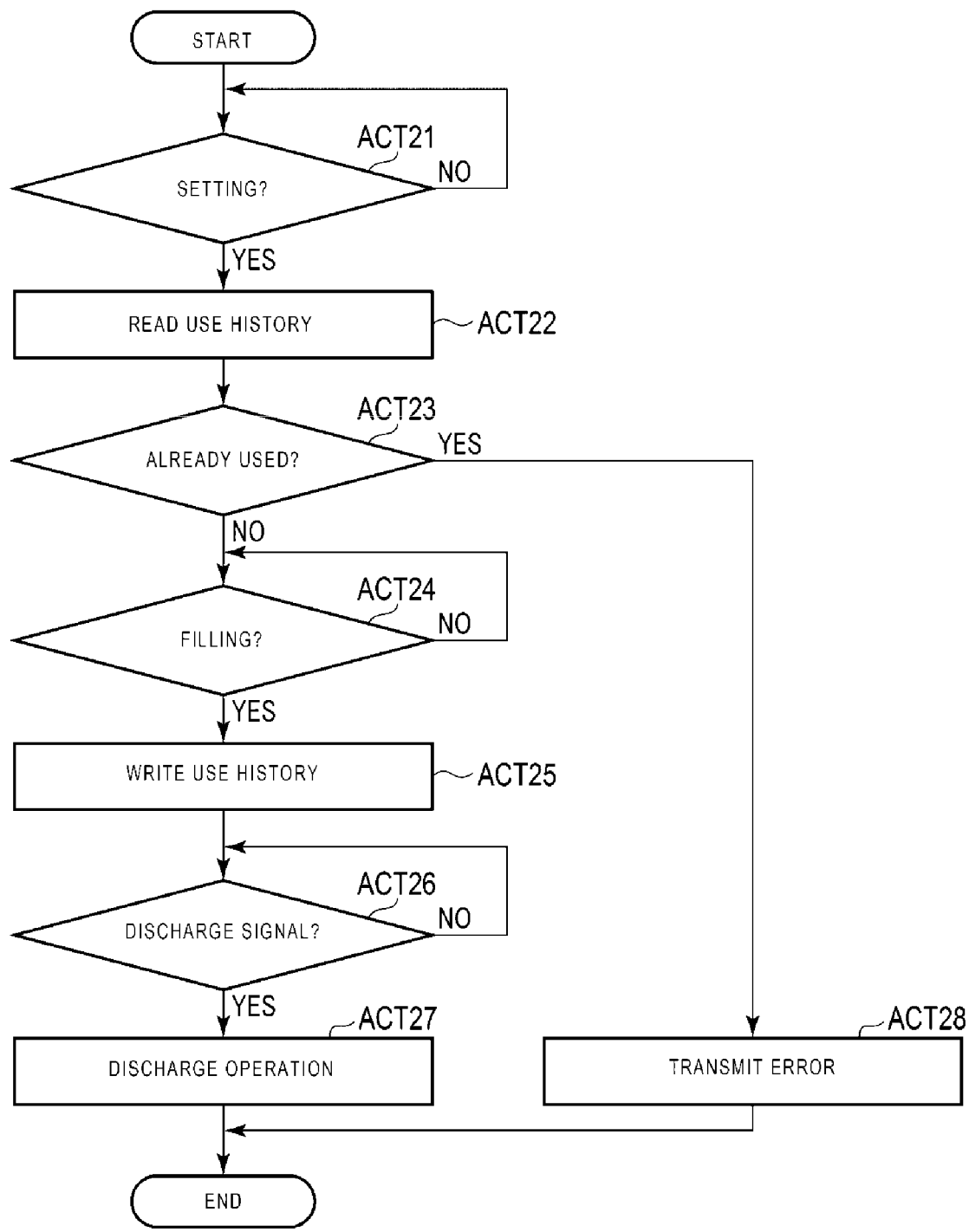
FIG. 9 is a flowchart showing an operation example of a liquid dispensing apparatus according to a second embodiment.

FIG. 9 is a flowchart for describing the operation example of the processor 15 of the chemical liquid dispensing apparatus 1.

First, the processor 15 determines whether or not the chemical liquid discharging device 2 is set in the mounting module 5 (ACT 21). When it is determined that the chemical liquid discharging device 2 is not set in the mounting module 5 (ACT 21, NO), the processor 15 returns to ACT 21.

When it is determined that the chemical liquid discharging device 2 is set in the mounting module 5 (ACT 21, YES), the processor 15 reads the use history from the IC module 50 (ACT 22). According to the use history, the processor 15 determines whether or not the use history indicates that the chemical liquid discharging device 2 has been previously used (ACT 23).

When the user history indicates that the chemical liquid discharging device 2 has not been used (unused) (ACT 23, NO), the processor 15 determines whether or not the filling signal has been received through the interface 17 (ACT 24). When it is determined that the filling signal has not been received through the interface 17 (ACT 24, NO), the processor 15 returns to ACT 24.

When it is determined that the filling signal has been received through the interface 17 (ACT 24, YES), the processor 15 rewrites the use history stored in the IC module 50 to indicate that the chemical liquid discharging device 2 has been used (ACT 25).

When the use history stored in the IC module 50 indicates that the chemical liquid discharging device 2 has been used, the processor 15 determines whether or not the discharge signal has been received through the interface 17 (ACT 26). When it is determined that the discharge signal has not been received through the interface 17 (ACT 26, NO), the processor 15 returns to ACT 26.

When it is determined that the discharge signal has been received through the interface 17 (ACT 26, YES), the processor 15 causes the chemical liquid discharging device 2 to discharge the liquid according to the discharge signal (ACT 27).

When it is determined that the use history indicates that the chemical liquid discharging device 2 has been used (ACT 23, YES), the processor 15 transmits the signal indicating that the chemical liquid discharging device 2 has been used to the host computer 18 through the interface 17 (ACT 28).

When the chemical liquid discharging device 2 has been caused to discharge the liquid (ACT 27), or when the signal indicating that the chemical liquid discharging device 2 has been used has been transmitted to the host computer 18 (ACT 28), the processor 15 ends the operation.

Similarly to the first embodiment, the IC module 50 may store the use history of each chemical liquid holding container 22. That is, the IC module 50 stores information indicating whether or not each chemical liquid holding container 22 has been used.

For example, the processor 15 acquires the use history of each chemical liquid holding container 22 from the IC module 50. After the processor 15 acquires the use history, the processor 15 receives the filling signal from the host computer 18 indicating the chemical liquid holding container has been filled. When the processor 15 receives the filling signal, the processor 15 determines whether or not the use history of the corresponding chemical liquid holding container 22 has been used. When the use history stored in the IC module 50 indicates that the chemical liquid holding container 22 has not been used (unused), the processor 15 rewrites the use history of the corresponding chemical liquid holding container 22 to indicate that the corresponding chemical liquid holding container 22 has been used.

When the use history indicates that the corresponding chemical liquid holding container 22 has been used, the processor 15 does not perform the discharge operation even after the processor 15 receives the discharge signal. In this case, the processor 15 may transmit a signal indicating that the corresponding chemical liquid holding container 22 has been used to the host computer 18.

The discharging system can rewrite the use history stored in the IC module to indicate that the chemical liquid discharging device has been used once the chemical liquid holding container has been filled with the liquid. As a result, the discharging system can store the information indicating that the chemical liquid discharging device has been used in the IC module of the chemical liquid discharging device and can prevent contamination after the chemical liquid holding container has filled with the liquid but has not discharged the liquid by the user.

Third Embodiment

A liquid discharging device according to a third embodiment is different from that of the first embodiment in that the liquid discharging device according to the third embodiment discharges the liquid by a thermal jet method. The same reference numerals are used for the components that are substantially the same as those of the first embodiment, and detailed descriptions of repeated components may be omitted.

The discharging system 500' according to the third embodiment includes a chemical liquid discharging device 2'.

The chemical liquid discharging device 2' includes a chemical liquid discharge array 27' in place of the chemical liquid discharge array 27.

Figure 10:
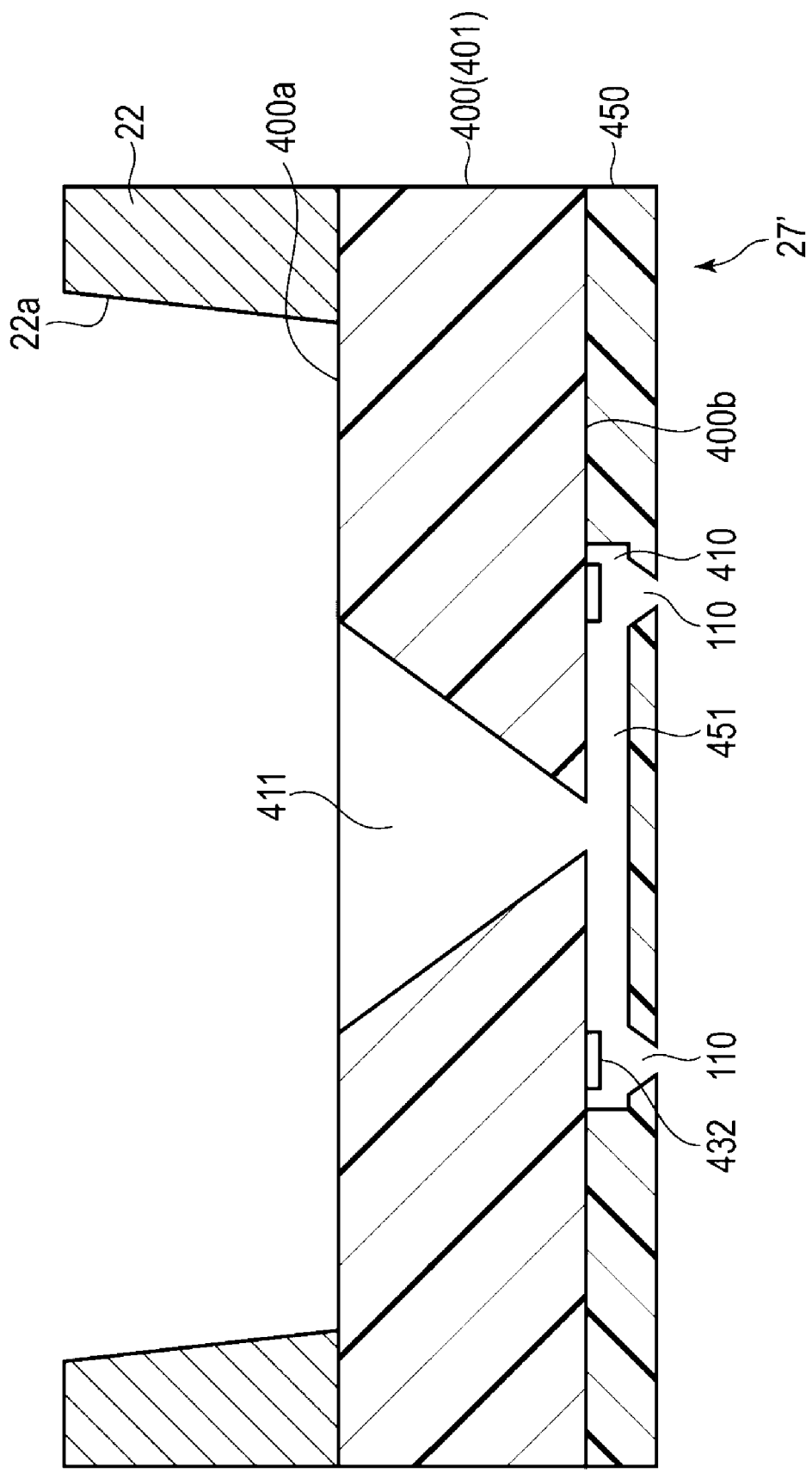
FIG. 10 is a cross-sectional view taken along a line F10-F10 of FIG. 4 according to a third embodiment.

FIG. 10 is a cross-sectional view taken along a line F10-F10 of FIG. 4.

As shown in FIG. 10, the chemical liquid discharge array 27' is formed by laminating a silicon substrate 400 and a photosensitive resin 450. An inlet port 411 connected to the bottom surface opening portion 22a of the liquid outlet port of the chemical liquid holding container 22 is formed on a surface side (referred to as a second surface 400a) of the silicon substrate 400. A thin film heat transfer heater 432 which is an actuator and a wiring (not specifically depicted) that is connected to the thin film heat transfer heater 432 are formed on a rear surface side (also referred to as a first surface 400b) of the silicon substrate 400. The thin film heat transfer heater 432 is electrically connected to the electrode terminal connection portion 26.

The photosensitive resin 450 is a substrate on which a pressure chamber 410 is formed. A flow path 451 connected to the inlet port 411, the pressure chamber 410, and the nozzle 110 are formed on the photosensitive resin 450. The pressure chamber 410 is an area where the thin film heat transfer heater 432 is formed in the flow path 451. The thin film heat transfer heater 432 generates heat by electric power supplied from a wiring. The liquid in the pressure chamber 410 is heated and boiled by the thin film heat transfer heater 432, and thus the liquid is discharged from the nozzle 110.

For example, a plurality of nozzles 110 is arranged in six rows in the X direction and two rows in the Y direction. The plurality of nozzles 110 is positioned inside the bottom surface opening portion 22a of the liquid outlet port of the chemical liquid holding container 22.

Next, an operation of discharging the liquid will be described. The bottom surface opening portion 22a of the lower portion of the chemical liquid holding container 22 is connected to the inlet port 411 and the flow path 451 of the chemical liquid discharge array 27'. The liquid in the chemical liquid holding container 22 is filled from the bottom surface opening portion 22a of the chemical liquid holding container 22 to each pressure chamber 410 in the flow path 451 formed on the photosensitive resin 450 through the inlet port 411 formed on the silicon substrate 400.

The voltage control signal input to the control signal input terminal 25 of the electrical substrate wiring 24 from the driving circuit 11 is applied to a plurality of thin film heat transfer heater 432 of the chemical liquid discharge array 27'. Therefore, the plurality of thin film heat transfer heater 432 generates heat, and the liquid in the pressure chamber 410 is heated and boiled. As a result, the liquid is discharged from the nozzle 110 as a chemical liquid droplet. A predetermined amount of liquid is dispensed from the nozzle 110 to the well 300 of the microplate 4.

In the thermal jet method, the liquid is come into contact with the thin film heat transfer heater 432 having a temperature equal to or higher than 300° C. Therefore, in the thermal jet method, it is preferable that the chemical liquid with high heat resistance that is not deteriorated even when the liquid is come into contact with a heater having a temperature equal to or higher than 300° C. is discharged.

The discharging system configured as described above stores the use history of the chemical liquid discharging device in the IC module provided in the corresponding chemical liquid discharging device. The discharging system checks the use history when the liquid is discharged from the chemical liquid discharging device. When the use history stored in the IC module indicates that the chemical liquid discharging device has been used, the discharging system does not discharge the liquid from the chemical liquid discharging device.

The discharging system 500' may have a characteristic of Second Embodiment. That is, the processor 15 of the chemical liquid dispensing apparatus 1 of the discharging system 500' stores the information indicating that the chemical liquid discharging device 2' has been used in the IC module 50 when the processor 15 detects that the chemical liquid holding container 22 of the chemical liquid discharging device 2' is filled with the chemical liquid.

The chemical liquid discharging device has a simple structure compared to a piezo jet method, and thus it is possible to miniaturize the actuator. Therefore, the chemical liquid discharging device can dispose the nozzles at high density compared to the piezo jet method.

In the example embodiments described above, the driving element 130 that is the driving unit has a circular shape. However, the shape of the driving unit is not limited. For example, the shape of the driving unit may be a diamond shape, an ellipse shape, or the like. The shape of the pressure chamber 210 is not limited to a circular shape, and the shape of the pressure chamber 210 may be a diamond shape, an ellipse shape, a rectangular shape, or the like.

In the example embodiment described above, the nozzle 110 is disposed at the center of the driving element 130. However, as long as the liquid can be discharged from the pressure chamber 210, the position of the nozzle 110 is not limited. For example, the nozzle 110 may be formed the outside of the driving element 130 rather than the inside of the area of the driving element 130.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid discharging device, comprising:
   a base member configured to be mounted on a liquid dispensing apparatus;
   a storage unit on the base member and storing a use history indicating whether the liquid discharging device has been previously used;
   a discharging device on the base member and configured to discharge a liquid when supplied a discharge voltage in response to a discharge signal received from the liquid dispensing apparatus;
   a communication unit on the base member and configured to communicate to and from the liquid dispensing apparatus; and
   a processor on the base member and configured to transmit the use history from the storage unit to the liquid dispensing apparatus via the communication unit, and rewrite the use history in the storage unit to indicate the liquid discharging device has been previously used according to a request received through the communication unit.

2. The liquid discharging device according to claim 1, wherein the processor changes the use history stored in the storage unit only after the liquid has been discharged.

3. The liquid discharging device according to claim 1, further comprising:
   a liquid holding container fluidly connected to the discharging device, wherein
   the processor changes the use history stored in the storage unit after the liquid holding container has been filled with the liquid.

4. The liquid discharging device according to claim 1, wherein the communication unit comprises a modulation/demodulation circuit and an antenna for wirelessly communicating with the liquid dispensing apparatus.

5. The liquid discharging device according to claim 1, wherein the discharging device comprises a piezoelectric film.

6. The liquid discharging device according to claim 1, wherein the discharging device comprises a heater.

7. The liquid discharging device according to claim 1, wherein the communication unit comprises a contact unit for physically and electrically connecting to the liquid dispensing apparatus.

8. The liquid discharging device according to claim 1, wherein the base member is a contact-type IC card.

9. The liquid discharging device according to claim 1, wherein the storage unit is a non-volatile memory unit.

10. The liquid discharging device according to claim 1, wherein the storage unit stores a control program that is executed by the processor when the base member is mounted on the liquid dispensing apparatus.

11. The liquid discharging device according to claim 1, further comprising:
    a plurality of discharging devices on the base member, each and configured to discharge a liquid when supplied a discharge voltage in response to a discharge signal received from the liquid dispensing apparatus.

12. The liquid discharge device according to claim 11, wherein the plurality of discharging devices are aligned in a row on the base member.

* * * * *